(12) United States Patent
Meli et al.

(10) Patent No.: US 6,414,769 B1
(45) Date of Patent: Jul. 2, 2002

(54) BIDIRECTIONAL MULTICHANNEL OPTICAL TELECOMMUNICATION SYSTEM

(75) Inventors: Fausto Meli, Piacenza (IT); Marcos Antonio Brandão Sanches, Lexington, SC (US)

(73) Assignee: Corning O.T.I., Inc., Corning, NY (US)

( * ) Notice: Subject to any disclaimer, the term of this patent is extended or adjusted under 35 U.S.C. 154(b) by 0 days.

(21) Appl. No.: 09/230,514

(22) PCT Filed: Jul. 28, 1997

(86) PCT No.: PCT/EP97/04090
§ 371 (c)(1),
(2), (4) Date: May 17, 1999

(87) PCT Pub. No.: WO98/05134
PCT Pub. Date: Feb. 5, 1998

(51) Int. Cl.[7] .................. H04B 10/00; H04B 10/12; H04B 10/16
(52) U.S. Cl. .................. 359/124; 359/130; 359/174
(58) Field of Search ............... 359/130, 161, 359/174, 176, 177

(56) References Cited

U.S. PATENT DOCUMENTS

| | | |
|---|---|---|
| 4,953,939 A | 9/1990 | Epworth |
| 5,204,923 A | 4/1993 | Grasso et al. |
| 5,210,808 A | 5/1993 | Grasso et al. |
| 5,267,073 A | 11/1993 | Tamburello et al. |
| 5,283,686 A | 2/1994 | Huber |
| 5,351,321 A | 9/1994 | Snitzer et al. |
| 5,563,733 A * | 10/1996 | Mitsuda ............ 359/341 |
| 5,742,416 A * | 4/1998 | Mizrahi ............ 359/134 |
| 5,748,350 A * | 5/1998 | Pan ............ 359/130 |
| 5,940,551 A * | 8/1999 | Oberg ............ 385/17 |
| 6,160,660 A * | 12/2000 | Aina ............ 359/341 |
| 6,288,810 B1 * | 9/2001 | Grasso ............ 359/127 |

FOREIGN PATENT DOCUMENTS

| | | |
|---|---|---|
| DE | 36 32 047 | 4/1988 |
| EP | 0 535 590 | 4/1993 |

(List continued on next page.)

OTHER PUBLICATIONS

Y.K. Chen et al., "Demonstration of In–Service Supervisory Repeaterless Bidirectional Wavelength–Division–Multiplexing Transmission System", IEEE Photonics Technology Letters, vol. 7, No. 9, pp. 1084–1086, (1995).

M.J. Chawki et al., "Evaluation of an Optical Booster Add/Drop Multiplexer OBADM including circulators and fiber grating filters", Proceedings of the European Conference on Optical Communication, vol. 1, pp. 47–50, (1995).

(List continued on next page.)

*Primary Examiner*—Jason Chan
*Assistant Examiner*—Agustin Bello
(74) *Attorney, Agent, or Firm*—Kevin A. Oliver; Foley Hoag & Eliot LLP

(57) ABSTRACT

An optical amplifier having a first input for inputting first optical signals propagating in a first direction having a first series of mutually distinct wavelengths; a first output for outputting second optical signals propagating in a first direction having the first series of mutually distinct wavelengths; a first amplifier for amplifying the first optical signals; a first optical circulator having an input port coupled to the first amplifier, an intermediate port coupled to a first end of a first selective reflection circuit, and an output port coupled to the first output; and a second optical circulator having an intermediate port coupled to a second end of the first reflection circuit, an output port coupled to a first selective splitter, and an input port coupled to a second selective splitter, where the input and output ports have passbands centered around a first predetermined wavelength of the first series.

10 Claims, 5 Drawing Sheets

FOREIGN PATENT DOCUMENTS

Figure 1:
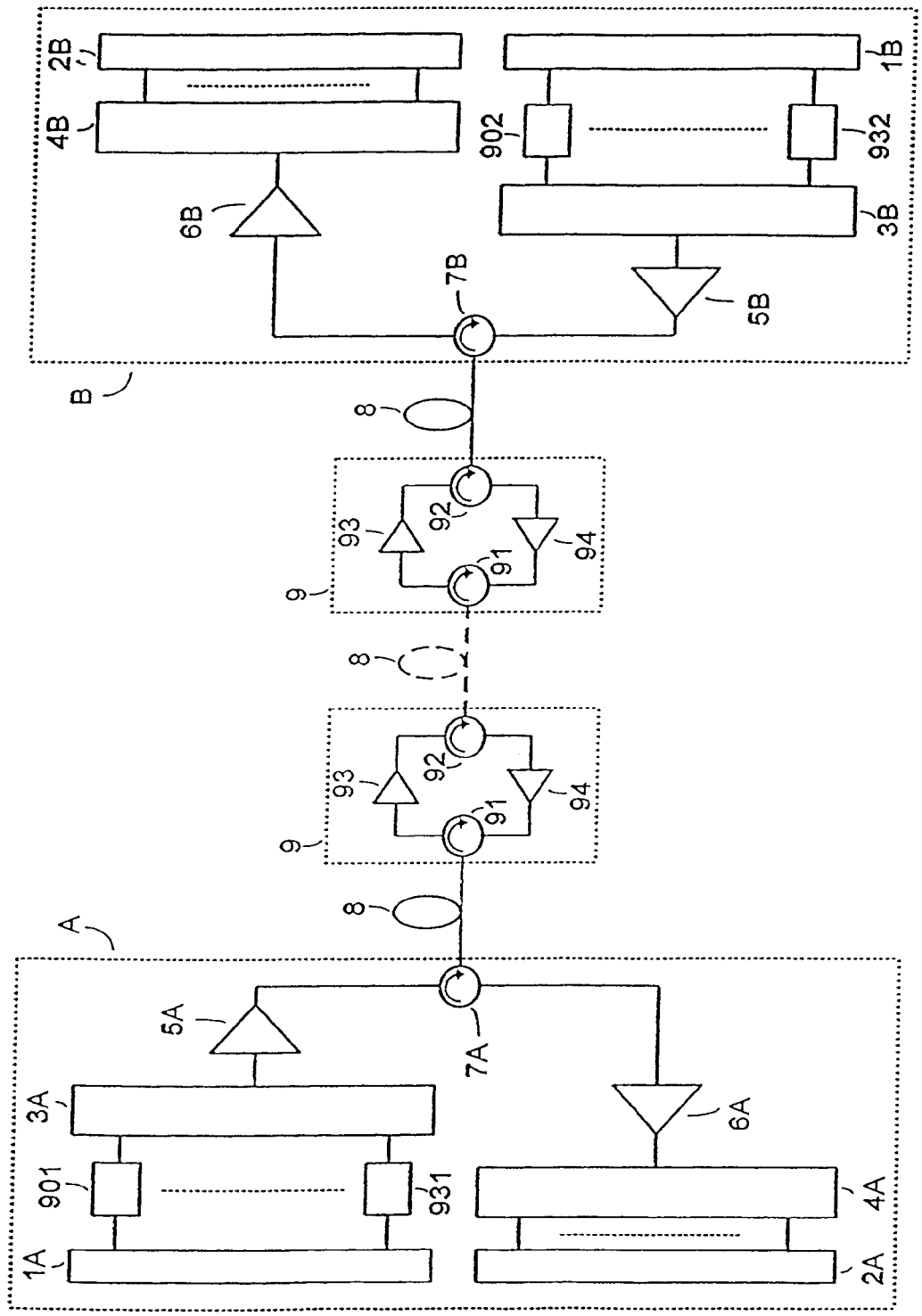

| | | |
|---|---|---|
| EP | 0 567 941 A2 | 11/1993 |
| EP | 0 567 941 A3 | 11/1993 |
| EP | 0 677 902 | 10/1995 |
| EP | 0 695 050 | 1/1996 |
| EP | 0 724 314 | 7/1996 |
| EP | 0 729 248 | 8/1996 |

OTHER PUBLICATIONS

S. Seikai et al., "Novel Optical Circuit Suitable for Wavelength Division Bidirectional Optical Amplification", Electronics Letters, vol. 29, No. 14, pp. 1268–1270, (1993).

C. W. Barnard et al., "Bidirectional Fiber Amplifiers", IEEE Photonics Technology Letters, vol. 4, No. 8, pp. 911–913, (1992).

P.C. Hill et al., "Strain gradient chirp of fibre Bragg gratings", Electronics Letters, vol. 30, No. 14, pp. 1172–1174, (1994).

* cited by examiner

BIDIRECTIONAL MULTICHANNEL OPTICAL TELECOMMUNICATION SYSTEM

DESCRIPTION

It is an object of the present invention to provide a bidirectional multichannel telecommunication system, a bidirectional optical amplifier, and a method for the bidirectional transmission of optical signals.

In the latest telecommunication technology, it is known to use optical fibers to send optical signals carrying information for long-distance communication.

It is also known that optical signals sent in an optical fiber undergo attenuation along the way, making it necessary to amplify the signal so that it will travel the entire required distance and reach the receiving station at a power level sufficient for correct signal reception.

Said amplification may be effected by means of appropriate amplifiers placed at predetermined intervals along the line, which periodically boost the power of the transmitted optical signal.

Optical amplifiers are suitably used for this purpose, by which the signal is amplified while remaining in optical form, i.e. without the optoelectronic detection and electrooptical regeneration of same.

Said optical amplifiers are based on the properties of a fluorescent dopant (e.g. erbium) which, if appropriately excited by the application of luminous energy, provides a strong emission in the wavelength band corresponding to the minimum attenuation of light in silica-based optical fibers.

Said amplifiers are unidirectional devices, i.e. having a predetermined direction of travel of the optical signal inside them.

This is due, as described for example in U.S. Pat. Nos. 5,204,923 and 5,210,808 of the Applicant, to the fact that the optical amplifiers, particularly if high gain values are required, incorporate unidirectional components that prevent signals reflected outside the amplifiers, e.g. due to Rayleigh scattering along the optical line fibers connected to the amplifiers, from returning into the amplifier, causing interferometric noise.

For the bidirectional transmission of optical signals, known technology generally calls for the use of two separate communication lines, equipped with their respective amplifiers, each of which is used to communicate in a single direction. This results in a high connection cost.

Nevertheless, some technologies are know whose objective is to permit bidirectional transmission on fiber-optic lines by means of bidirectional optical amplifiers.

Bidirectional amplification schemes have been presented with the use of a single unidirectional amplifier that exploit the possibility of fluorescent doped amplifiers to independently amplify signals at different wavelengths.

A bidirectional amplifier based on this principal is described in the article by S. Seikai et al.: "Novel Optical Circuit Suitable for Wavelength Division Bidirectional Optical amplification", published in Electronics Letters, vol. 29, no. 14, Jul. 8, 1993, pages 1268–1270. It discusses a device placed along a fiber-optic transmission line in which two signals with different wavelengths propagate in opposite directions and which consists of wavelength selective couplers and a known type of unidirectional doped-fiber amplification unit connected by sections of passive optical fiber. The wavelengths of the signals are both internal to amplification band of the doped fiber. By means of selective couplers the two signals at different;wavelengths are input to different optical paths. The two optical paths coincide only in the section corresponding to the amplifying fiber, which is passed through by the two signals in the same direction. The device has a problem of instability caused by internal reflections at a wavelength between those of the propagating signals, a problem resolved through the addition of filters, some of them adjustable, which results in a highly complicated structure and the need to use devices to accurately and continuous adjust said filters.

Patent application EP96100586, filed on Jan. 17, 1996 in the name of the Applicant, describes, among other things, a bidirectional optical amplifier comprising:

an optical amplification unit including at least an optical isolator, two optical input and output ports for at least two optical signals having opposite propagation directions, said signals having, respectively, a first and a second distinct wavelengths, two first and two second wavelength selective optical couplers, having respectively a first wavelength passband, including said first wavelength, and a second wavelength passband, including said second wavelength, with no overlapping, said amplification unit being connected between two opposite nodes of an optical bridge circuit, to whose other opposite nodes said input and output ports are connected, and said first and second selective optical couplers being present at the nodes of said bridge circuit, in which said first and second selective couplers are arranged symmetrically with respect to the amplification unit and with respect to the input and output ports of said optical signals.

Bidirectional amplification schemes have also been presented with separation of the counterpropagating signals and the use of a unidirectional amplifier for each direction.

As an example, the article by C. W. Barnard et al. "Bidirectional Fiber Amplifiers", published in IEEE Photonics Technology Letters, vol. 4, no. 8, August 1992, pages 911–913, describes bidirectional erbium-doped fiber amplifier repeaters for bidirectional fiber networks and OTDR fault detection. At each repeater the counterpropagating signals are separated, amplified separately, then recombined. Signal separation is done by a bidirectional fiber coupler or an optical circulator. According to the authors, for example, one propagation direction could be assigned 1525–1535 nm, the other could be assigned 1550–1560 nm, and the OTDR wavelength could be 1548 nm.

Optical telecommunication systems are known with wavelength division multiplexing (WDM) transmission. In these systems, a number of channels are sent, i.e. a number of mutually independent transmission signals, on the same line, usually consisting of an optical fiber, by means of optical wavelength multiplexing. The transmitted channels can be either digital or analog and are mutually distinguished because each of them is associated with a specific wavelength.

U.S. Pat. No. 5,283,686, in the name of D. R. Huber, describes, among others, optical systems including an optical amplifier and a narrow-bandwidth optical filter for removing undesired spontaneous emission. An in-fiber Bragg grating reflector reflects substantially only the input amplified signal back to an optical circulator port. The undesired emission exits from the grating reflector and is removed from the system. Cascaded grating reflectors are used in a wavelength division multiplexing (WDM) system. The article of K. Y. Chen et al., "Demonstration of in service supervisory repeaterless bi-directional wavelength division multiplexing transmission system", vol. 7, no. 9, Sep. 1, 1995, states that repeaterless long distance fiber transmission systems using erbium doped fiber amplifiers as a transmitter power amplifier and/or as a receiver preamplifier have many applications, in which cases it is infeasible or impossible to have an in line amplifier, such as island hopping and intracity links. In this letter, an in service supervisory repeaterless bi-directional six WDM channel transmission over a 200 Km single fiber link is demonstrated.

The patent application EP 0 535 590 discloses a two way repeater apparatus for directly amplifying optical signals, to be transmitted in mutually opposite directions. Said repeater receives an outward input optical signal S1 of 1.552 microns in wavelength at an input/output terminal 1, and receives an inward optical signal S1r of 1.536 microns in wavelength at an input/output terminal 20.

The patent application DE 36 32 047 A discloses a communication system used for digital narrow band and wideband signals transmitted in both directions via a single optical waveguide.

The article of M. J. Chawki et al., "Evaluation of an optical boosted add/drop multiplexer OBADM including circulators and fiber grating filters", proceeding of ECOC, vol. 1, Sep. 17, 1995, discloses two OBADM configurations wherein bi-directional EDFA and fiber grating filters are placed between the 2 circulators.

The patent application EP 0 729 248, corresponding to the patent U.S. Pat. No. 5,633,741, discloses that WDM optical fiber communications entails bi-directional transmission with at least two WDM channels in opposite transmission directions in a single fiber. Communication is by a single fiber transmission line served by bi-directional amplifiers. The amplifier includes fiber gratings that serve as filters and stabilize against oscillation due to reflections and to Rayleigh back scattering.

It is known that the wavelength bandwidth available for signals, in optical communication systems with doped-fiber amplifiers, is limited by the characteristics of the active dopant used. In the case of amplifiers doped with erbium, for example, said bandwidth is limited to the wavelength bandwidth included approximately between 1530 and 1565 nm.

The Applicant has observed that the known WDM communication systems are further limited regarding the number of channels, i.e. the independent wavelengths usable for transmission within said amplification bandwidth.

The need to reduce noise, particularly of the interferometric type, associated with the retroreflection of signals or noise toward the amplifiers, makes it imperative to maintain a good isolation between the channels at the various wavelengths propagating in the system, i.e. a good suppression of radiation at intermediate wavelengths between those of the communication channels. This isolation may be obtained, in known systems, only by maintaining a channel separation greater than a predetermined minimum value, which limits the number of channels usable in the available wavelength bandwidth. This minimum value depends on the characteristics of the components employed in the system, such as the spectral characteristics of the wavelength selective components (e.g. bandwidth, center-band attenuation, figure of merit) and wavelength stability (thermal and temporal) of the filters and of the optical signal sources.

Furthermore, to separate signals with different wavelengths, e.g. to drop some of them to receivers placed in intermediate amplification nodes or to send them, at the receiving station, to separate receivers, contiguous channels (in terms of wavelength) must be separated by more than a predetermined limit value.

Said limit value depends primarily on the characteristics of the wavelength selective components employed along the optical signal path.

By means of the present invention it is possible to transmit in an optical telecommunication system a number of independent optical channels greater than is permitted by known techniques, by employing wavelength selective components of equal characteristics.

The Applicant has found that by feeding wavelength-contiguous channels in two opposite directions in the system it is possible to use filtering, multiplexing and demultiplexing means having spectral resolution greater than the spacing between the channels.

According to a first aspect, the present invention concerns a bidirectional multichannel optical telecommunication system comprising:

means for generating optical signals suitable for generating at least three optical signals having, respectively, a first, a second and a third mutually distinct wavelengths;

a line for transmitting optical signals;

means for inputting said first and third optical signals to said transmission line, placed at a first end of said transmission line;

means for inputting said second optical signal to said transmission line, placed at a second end of said transmission line opposite from said first end; characterized by the fact that the value of said second wavelength is comprised between said first and third wavelengths.

According to another aspect, the present invention regards a multichannel optical telecommunication system for transmitting optical signals comprising:

a fiber-optic line having a first and a second end;

means for inputting, at said first end of said line, first optical signals propagating in a first direction and having a first series of mutually distinct wavelengths;

means for inputting, at said second end of said line, second optical signals propagating in a second direction, opposite to said first direction, and having a second series of wavelengths mutually distinct and distinct from the wavelengths of said first optical signals;

first means for demultiplexing said optical signals, at said second end of said line, and second means for demultiplexing optical signals at said first end of said line, said first and said second means of demultiplexing being suitable for demultiplexing signals distant from each other in wavelength by a quantity greater than or equal to a predetermined minimum value.

Characterized by the fact that the wavelengths of said first signals differ from each other by a quantity greater than or equal to said minimum value, the wavelengths of said second signals differ from each other by a quantity greater than or equal to said minimum value, while the wavelengths of said first signals differ from the wavelengths of said second signals by a quantity greater than or equal to half said minimum value.

In one of its versions, said system comprises bidirectional amplification means optically connected along said fiber-optic line. Preferably, said means comprise:

means for separating said first signals from said second signals;

means for amplifying said first signals;

means for amplifying said second signals;

means for combining said first and second signals.

Said means for separating and said means for combining include respective optical circulators.

Said means for amplifying said first and second signals may be unidirectional and may comprise respective comb filters suitable for transmitting signals at wavelengths within bands including the wavelengths of said first and said second signals, respectively, and suitable to attenuate radiation at wavelengths external to said bands. Said comb filters may comprise an optical circulator and Bragg grating reflectors cascaded at an intermediate port of said circulator.

In one version of said system, said minimum distance value is less than or equal to 1 nm.

According to a third aspect, the present invention regards a multichannel optical telecommunication system for the transmission of optical signals comprising:

a fiber-optic line;

multiplexing and demultiplexing means, for adding and dropping, in at least two different positions along said line, optical signals having mutually distinct wavelengths, said multiplexing and demultiplexing means having a spectral resolution greater than the minimum spacing between channels, characterized by the fact that channels contiguous in wavelength are fed in opposite directions along said line.

According to a fourth aspect, the present invention regards a bidirectional optical amplifier comprising:

means for inputting first optical signals propagating in a first direction and having a first series of mutually distinct wavelengths;

means for inputting second optical signals propagating in a second direction, opposite said first direction, and having a second series of wavelengths, mutually distinct and distinct from the wavelengths of said first optical signals;

means for separating said first optical signals from said second optical signals;

means for amplifying said first signals;

means for amplifying said second signals;

means for combining said first and said second signals; characterized by the fact that the wavelengths of said first and said second signals are mutually staggered.

Said means for separating and said means for combining advantageously comprise respective optical circulators.

Said means for amplifying said first and second signals may be unidirectional and may includes respective comb filters suitable for transmitting signals at wavelengths within bands comprising the respective wavelengths of said first and said second signals and suitable for attenuating radiation at wavelengths external to said bands. Said comb filters may comprise an optical circulator and Bragg grating reflectors cascaded at an intermediate port of said circulator.

According to a fifth aspect, the present invention regards a method for the bidirectional transmission of optical signals along an optical communication line comprising the steps of:

generating first optical signals at a first series of wavelengths;

generating second signals at a second series of wavelengths, different from the wavelengths of said first series;

transmitting said first signals in a first direction along the optical telecommunication line;

transmitting said second signals in a second direction along the optical telecommunication line; in which the wavelengths of said first signals are staggered with respect to the wavelengths of said second signals.

In one version, said method comprises the step of amplifying said first and said second signals along the optical communication line, which in turn preferably comprises the steps of;

separating said first from said second signals;

amplifying said first signals by means of a first optical amplifier;

amplifying said second signals by means of a second optical amplifier;

recombining said first and said second signals along said telecommunication line.

Figure 2:
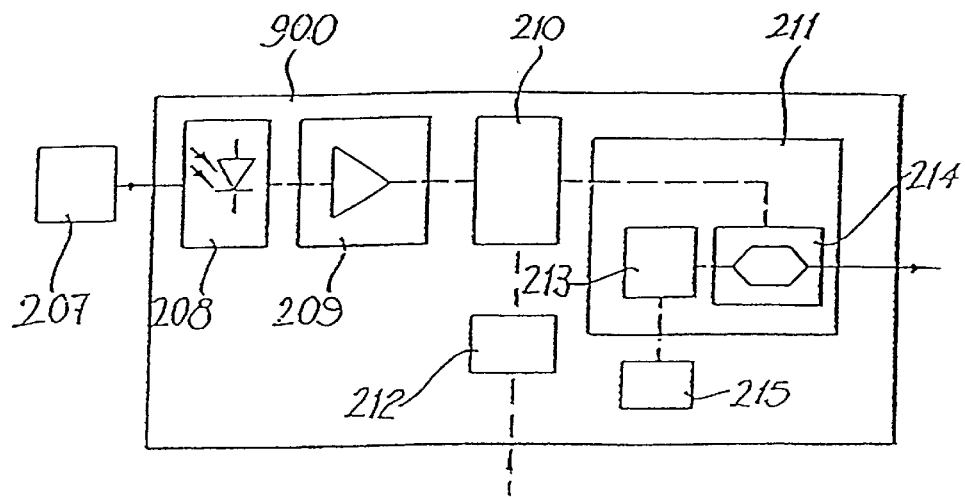
Figure 3:
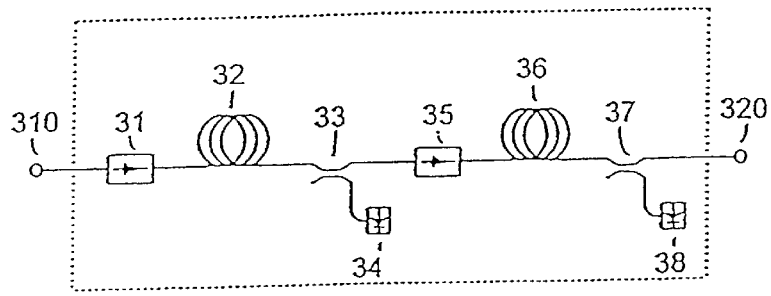
Figure 4:
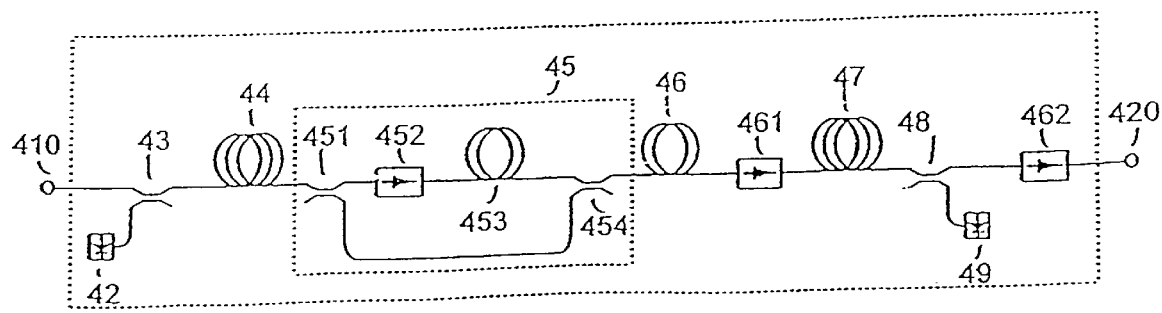
Figure 5A:
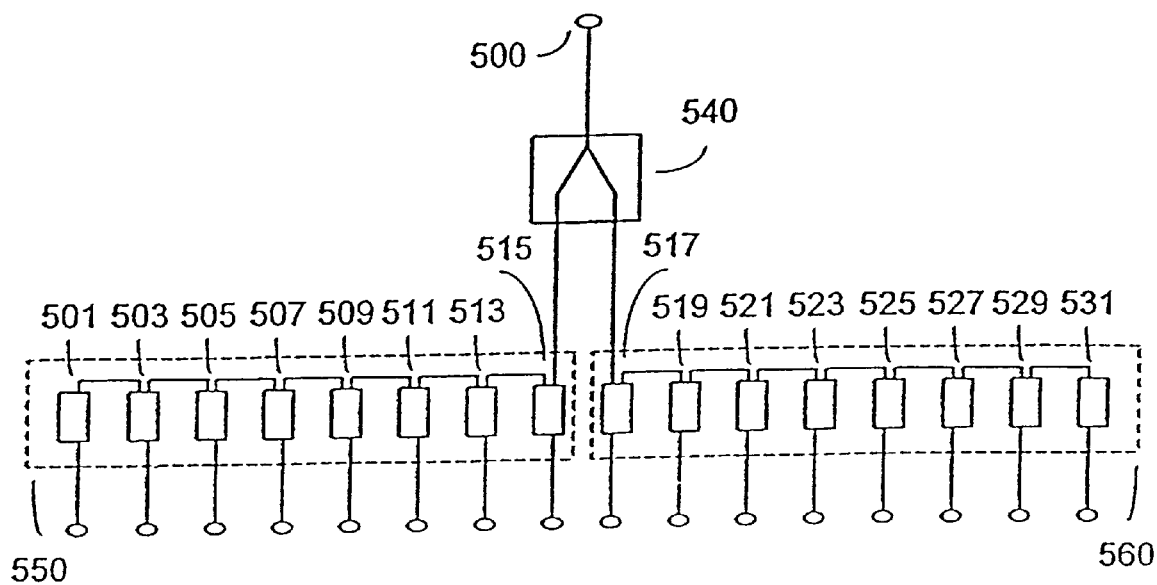
Figure 5B:
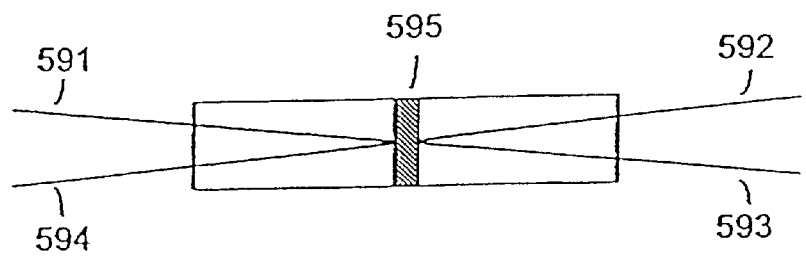
Figure 6:
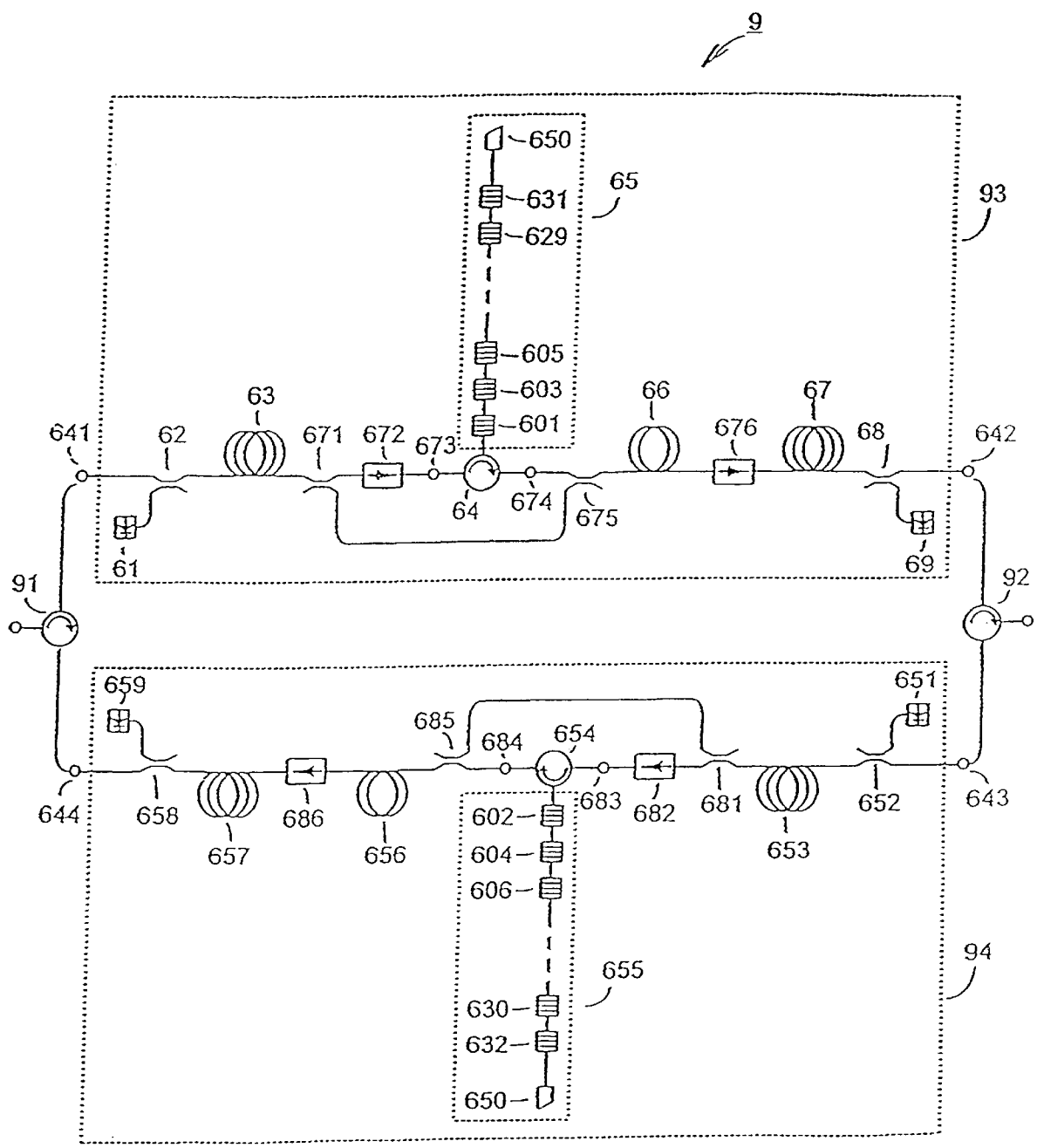
Figure 7:
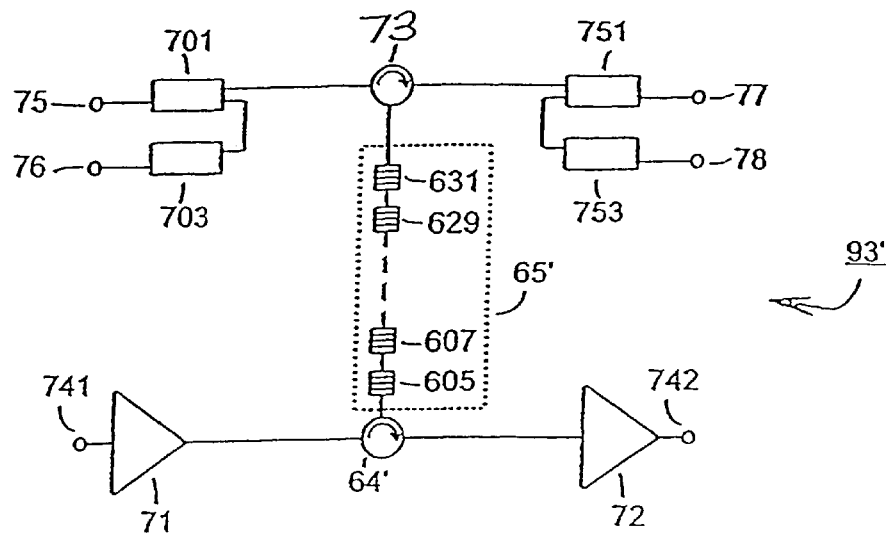
Figure 8:
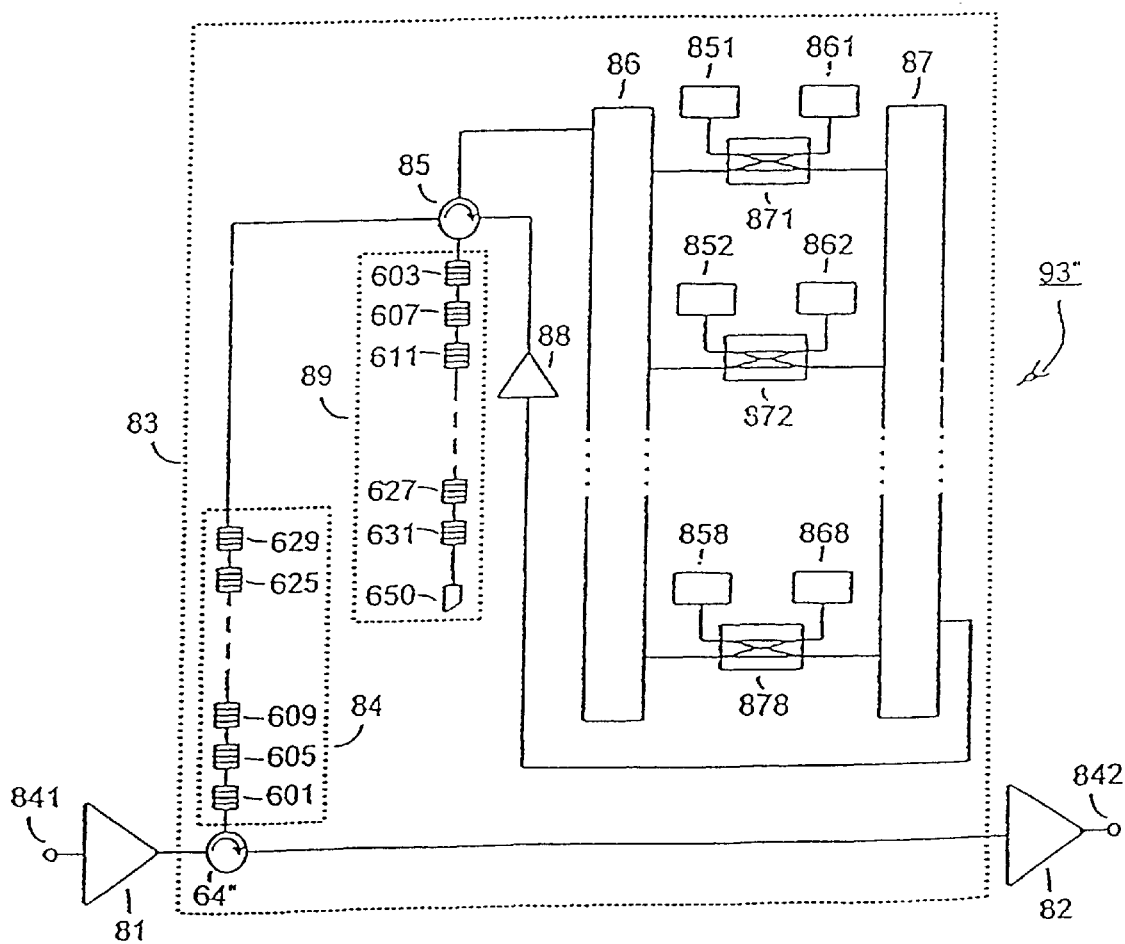

Additional information may be derived from the following description, with reference to the attached drawings showing:

in FIG. 1 diagram of an optical telecommunication system;

in FIG. 2 diagram of a transmission interfacing unit;

in FIG. 3 diagram of an optical power amplifier;

in FIG. 4 diagram of an optical preamplifier;

in FIG. 5A diagram of an optical demultiplexer;

in FIG. 5B diagram of a wavelength-selective optical splitter;

in FIG. 6 diagram of a bidirectional optical amplifier in FIG. 7 diagram of an optical amplifier associated with a device of a first type for adding and dropping signals;

in FIG. 8 diagram of an optical amplifier associated with a device of a second type for adding and dropping signals.

As shown in FIG. 1, a bidirectional optical telecommunication system with wavelength-division multiplexing, according to the present invention, comprises two terminal stations A and B, each of which includes a respective transmission station 1A, 1B and a respective receiving station 2A, 2B.

In particular, in the version shown in the figure, transmission station 1A comprises 16 optical signal transmitters with a first series of wavelengths, indicated with odd-numbered subscripts, $\lambda_1, \lambda_3, \ldots, \lambda_{31}$ (included, for example, in the wavelength band of 1530–1565 nm) and transmission station 1B comprises 16 optical transmitters with a second series of wavelengths, indicated with even-numbered subscripts, $\lambda_2, \lambda_4, \ldots, \lambda_{32}$.

The wavelengths of the second series are selected so that they are staggered with respect to the wavelengths in the first series.

In other words, each pair of wavelengths of one series encompasses a wavelength of the other series.

In the present case, the wavelengths of the two series will be indicated as staggered, more generally, even when the wavelengths of the signals of each of said series, corresponding to optical signals emitted by one of the transmission stations 1A, 1B and propagating in the system in one of the two directions, are separated (in frequency) by a quantity greater than or equal to 2D, where D indicates the minimum bandwidth (in frequency) of the wavelength selective components used in the system to separate the signals at the various wavelengths.

The number of independent wavelengths used for the signals for each transmission station is not limited to the value of 16 indicated in the device described and may assume a different value. The number of wavelengths, corresponding to the number of optical channels used for transmission in each direction, may be selected in relation to the characteristics of the telecommunication system. In particular, in a telecommunication system according to the present invention, it is possible, after the system implementation, to increase the number of channels to increase the transmitting capacity of the system, e.g. to accommodate an increased traffic demand, as will be indicated below.

The wavelengths may be selected so that the corresponding frequencies are equally spaced within the available spectral amplification band, so as to utilize said band efficiently.

It is possible, however, for the frequencies to be totally or partially unequally spaced, e.g. so as to reduce the effect of non-linear phenomena, such as four wave mixing (FWM) in optical fibers used for transmitting the signals.

The useful amplification band of the amplifiers may also be constituted of two or more distinct spectral bands separated by spectral bands not well-suited for signal transmission or amplification, e.g. due to the particular spectral characteristics of the amplifiers or optical fibers employed in the telecommunication system. In this case, the wavelengths of the communication channels may, for example, be selected such that the corresponding frequencies are equally spaced within each individual spectral band, with the separation between adjacent channels propagating in the same direction greater than or equal (in frequency) to twice said value D.

As an example, the wavelengths may assume values between about 1535 nm and about 1561 nm, where consecutive wavelengths, in ascending order, are used alternately for each of the two series $\lambda_1, \lambda_3, \ldots, \lambda_{31}$ and $\lambda_2, \lambda_4, \ldots, \lambda_{32}$. The spacing between the 32 total wavelengths, in this case, is about 0.8 nm.

The optical transmitters comprised in transmission stations 1A and 1B are modulated, directly or with external modulation, according to system requirements, in particular in relation with the chromatic dispersion of the optical fibers in the system, with their lengths, and with the intended transmission velocity.

The outputs of each transmitter of transmission stations 1A and 1B are connected to multiplexers 3A and 3B, respectively, which combine their optical signals each toward a single output, connected respectively to the input of optical power amplifiers 5A and 5B. The outputs of these amplifiers are connected to an input port of optical circulators 7A and 7B.

An intermediate port of optical circulators 7A and 7B is connected to one end of an optical line 8, which connects the two terminal stations A and B together.

The optical fiber of optical line 8 is normally a singlemode optical fiber of the step index or dispersion shifted type, conveniently included in a suitable optical cable, and has tens (or hundreds) of kilometers of length between each amplifier, up to the desired connection distance.

Inserted along line 8 are bidirectional optical amplifiers 9. Each of them comprises two optical circulators 91 and 92 and two optical amplifiers 93 and 94, which will be described further on. A central port of each optical circulator is connected to the optical fiber of line 8, e.g. through an optical connector, and acts as an input/output port for the bidirectional amplifier. Optical amplifier 93 is optically connected between an output port of optical circulator 91 and an input port of optical circulator 92. Optical amplifier 94 is optically connected between an output port of optical circulator 92 and an input port of optical circulator 91.

Although FIG. 1 indicates two bidirectional optical amplifiers 9, there may be one or more bidirectional optical amplifiers in succession, depending on the overall length of the optical connection and the power in the various sections of it. A fiber section between a terminal station and an amplifier, for example, or between two successive amplifiers, may be on the order of 100 kilometers long.

Receiving stations 2A and 2B are connected to the output ports of optical circulators 7A and 7B through preamplifiers 6A and 6B and demultiplexers 4A and 4B.

The optical circulators are passive optical components, commonly equipped with three or four access ports placed in an ordered sequence. After defining a first arbitrarily chosen access port as "input port", the next ports in sequence will be indicated as central port and output port The optical circulators transmit unidirectionally the radiation input by each of the ports to one only of the other ports, namely the next one in sequence. The circulators used in the present invention are preferably of the polarization-independent type.

Preamplifier, in the context of the present invention, is an amplifier dimensioned to compensate the losses of the last section of optical line and the insertion losses of demultiplexer 4A or 4B, so that the power level of the signal input to the receiver is suited to the sensitivity of the device. It is also the task of the preamplifier to limit signal dynamics, reducing the power level variations of the signals at the receiver input with respect to the power level variation of the signals from the transmission line. Demultiplexers 4A and 4B are suited for taking 16 signals overlapped in a single input port connected to the output of preamplifier 6A, 6B and separating them on to 16 optical fibers, in accordance with their respective wavelengths.

When the optical signals for transmission are generated by signal sources with their own transmission characteristics (such as wavelength, modulation type, power) different from those envisaged for the described link, each transmission station 1A, 1B comprises interfacing units 901, 903, . . . , 931 and 902, 904, . . . , 932, respectively, for receiving the optical signals generated by transmission stations 1A, 1B, detecting them, regenerating them with new characteristics suited to the transmission system and sending them to multiplexers 3A, 3B.

In particular, said interfacing units generate optical working signals with wavelengths $\lambda_1, \lambda_3, \ldots \lambda_{31}$ and $\lambda_2, \lambda_4, \ldots, \lambda_{32}$, respectively, suited to the system requirements as described below.

U.S. Pat. No. 5,267,073 by this same Applicant, describes interfacing units comprising in particular a transmission adaptor for converting an optical input signal into a form well-suited for the optical transmission line and a reception adaptor for converting the transmitted signal into a form well-suited for a reception unit.

For use in the system of the present invention, the transmission adaptor comprises, preferably, an externally modulated laser as an output signal generation source.

The diagram of a transmission interfacing unit 900, of the type well-suited for use within the context of this invention, is shown in FIG. 2 in which, for the sake of clarity, the optical connections are represented by solid lines, while the electrical connections are represented by broken lines.

The optical signal, coming from an external source 207, is received by a photodetector (photodiode) 208, which emits an electrical signal which is fed to an electronic amplifier 209.

The electrical signal output by amplifier 209 is fed to a circuit 210 that drives a modulable laser emitter, designated overall as 211, that generates an optical signal at the selected wavelength, containing the information of the incoming signal.

If appropriate, a circuit 212 for inputting a service channel may be connected to driving circuit 210.

Modulable laser emitter 211 includes a continuous emission laser 213 and an external modulator 214, e.g. of the Mach-Zehnder type, driven by the output signal of circuit 210.

A circuit 215 controls the emission wavelength of laser 213, keeping it constant at the specified value and compensating for any external disturbances such as temperature and the like.

Transmission interfacing units of the type indicated are described in the aforesaid patent and marketed by the Applicant under the designation TXT/EM-XXX.

As an alternative, the laser transmitters in transmission stations 1A and 1B may be laser transmitters operating at the selected wavelengths, e.g. using DFB lasers at wavelengths $\lambda_1, \lambda_3, \ldots, \lambda_{31}$ and $\lambda_2, \lambda_4, \ldots, \lambda_{32}$, respectively.

Preferably, the wavelength of each source used for the signals is stable within +/−0.25 nm, more preferably within +/−0.1 nm.

With reference to FIG. 1, the optical circulators are components available commercially. A model well-suited for use in the present invention, for example, is the PIFC-100 produced by E-TEK DYNAMICS Inc., 1885 Lundy Ave., San Jose, Calif. (USA), characterized by an attenuation of 0.7 dB in transmission between two consecutive ports and by a response substantially independent from polarization.

Power amplifiers 5A and 5B raise the level of the signals generated by transmission stations 1A and 1B to a value sufficient to travel the section of optical fiber separating them from the receiving station or amplification means with sufficient terminal power to ensure the required transmission quality.

A power amplifier well-suited for use in the present invention will now be described with reference to FIG. 3.

The power amplifier represented is of the two-stage type. A first amplification stage comprises an active fiber 32, pumped counterdirectionally by a pumping source 34 through a dichroic coupler 33.

A second amplification stage comprises an active fiber 36, pumped counterdirectionally by a pumping source 38 through a dichroic coupler 37.

An amplifier input 310 is connected through a first optical isolator 31 to the first amplification stage, and precisely to active fiber 32, whose output terminates in a branch of dichroic coupler 33. Pumping source 34 is connected to a second branch of dichroic coupler 33, while a third branch of the same dichroic coupler constitutes the signal output of the first stage.

A second optical isolator 35 is located between the output of the first stage and an input of active fiber 36 of the second stage, whose output terminates in a branch of dichroic coupler 37. Pumping source 38 is connected to a second branch of dichroic coupler 37, while a third branch of the same coupler constitutes the signal output of the second stage, which terminates in an output 320, consisting preferably of a very-low-reflection optical connector, e.g. an angled connector with reflectivity less than −55 dB. Optical connectors of this type are marketed, for example, by SEIKOH GIKEN, 296-1 Matsuhidai, Matsudo, Chiba (Japan).

Output 320 is connected, in the telecommunication system of FIG. 1, with an optical circulator (7A or 7B). This circulator permits the unidirectional passage of radiation output by the power amplifier and prevents radiation from entering by that output. The circulator is thus equivalent to an additional optical isolator connected to the amplifier output, particularly in limiting its interferential noise.

Active optical fibers 32 and 36 are preferably silica optical fibers. A rare earth is used as a dopant, preferably erbium. Aluminum, germanium and lanthanum, or aluminum and germanium, may be advantageously used as secondary doping agents.

The concentration of dopants may correspond, for example, to an attenuation of around 7 dB/m, for the active fiber in the absence of pumping.

In a preferred embodiment, the amplifier described uses erbium-doped active fibers of the type presented in detail in patent application EP 677902, in the name of the Applicant.

The lengths of active fibers 32 and 36 may be around 7 m and 5 m, respectively.

For dichroic couplers 33 and 37, fused-fiber couplers may be used, formed of monomodal fibers at 980 nm and in the 1530–1565 nm wavelength band, with optical power output variation with respect to polarization <0.2 dB.

Dichroic couplers of the type indicated are known and commercial and are produced, for example, by the aforesaid E-TEK DYNAMICS.

Optical isolators 31 and 35 are of the type independent of the transmission signal polarization, with isolation greater than 35 dB and reflectivity less than −50 dB. The isolators are, for example, model MDL 1-15 PIPT-A S/N 1016 of the firm ISOWAVE, 64 Harding Ave., Dover, N.J. (USA) or model PIFI 1550 IP02 of the aforesaid E-TEK DYNAMICS.

Pumping sources 34 and 38 may be, for example, quantum well lasers with an emission wavelength of $\lambda_p$=980 nm. The optical emission power envisaged is around 75 mW for source 34 and 90 mW for source 38.

Lasers of the type indicated are produced, for example, by LASERTRON INC. 37 North Avenue, Burlington, Mass. (USA).

A power amplifier like the one described furnishes, for example, output power of around 16 dBm, with a noise figure of around 5 dB.

The power amplifier described with reference to FIG. 3 uses counterpropagating pumping for both amplification stages. Counterpropagating pumping for both stages or for just one of them, the first stage in particular, are equally possible. The choice of which configuration to use is left to the skilled in the art, according to the characteristics of the overall communication system.

The optical power amplifier may also be embodied as a single-stage amplifier, depending on the gain required and the characteristics of the telecommunication system in which it is to be used. It is possible, for example, with reference to the device in FIG. 3, to omit active fiber 36, dichroic coupler 37 and pumping source 38. This simpler configuration offers less optical output power and may be sufficient for particular embodiments of the amplification system, e.g. with a smaller number of communication channels or with optical fiber sections of limited length downstream of the amplifier.

Preamplifiers 6A and 6B of the system in FIG. 1 are, for example, optical amplifiers of the type that will be described now with reference to FIG. 4, which represents a two-stage preamplifier.

A first amplification stage comprises a first active fiber 44, pumped by a pumping source 42 through a dichroic coupler 43, a differential attenuator 45, connected to the output of active fiber 44, to attenuate the telecommunication signals without significantly attenuating the residual pumping radiation, and a second active fiber 46 pumped by means of said residual pumping radiation.

A second amplification stage includes an active fiber 47, pumped by a pumping source 49 through a dichroic coupler 48.

An input 410 of the preamplifier, consisting preferably of a very-low-reflection optical connector, e.g. of the type previously indicated, is connected to the first amplification stage, and precisely to a first input of dichroic coupler 43, to a second input of which pumping source 42 is connected. An output of dichroic coupler 43 terminates in active fiber 44.

Input 410 is connected, in the telecommunication system in FIG. 1, to an optical circulator (7A or 7B). This circulator permits the unidirectional passage of radiation to the preamplifier and prevents radiation from exiting that input. The circulator is thus equivalent to an additional optical isolator connected to the amplifier input, particularly in limiting interferential noise.

Differential attenuator 45 is connected between active fiber 44 and active fiber 45. Its function is to attenuate the telecommunication signals by a predetermined quantity without significantly attenuating the residual pumping radiation from active fiber 44. A differential attenuation of the signals with respect to the pump, in a suitable intermediate position between two sections of active fiber of an optical amplifier, as described in patent applications EP567941 and EP695050 in the name of the Applicant, makes it possible to compress the amplifier dynamics, i.e. to limit the power variations of the signals output by the amplifier with respect to the power variations of the input signals.

Differential attenuator 45 comprises a dichroic coupler 451 to separate the signals at the telecommunication channel wavelengths to a first output and the residual radiation at the wavelength of pumping source 42 to a second output. Said first output is connected via an optical isolator 452 to a first input of a dichroic coupler 454. Said second output is connected via a section of optical fiber to a second input of dichroic coupler 454. Optical isolator 452 provides an attenuation of around 1 dB to the telecommunication signals that transit through it, while the residual pump radiation is not significantly attenuated. The optical isolator also blocks the counterpropagating radiation, with the effect of reducing the amplifier noise. A section of attenuating optical fiber 454, with predetermined attenuation, can be connected in lieu of the optical isolator, or preferably in series with it. The characteristics of this attenuating fiber may be predetermined according to the indications contained in the two patent applications cited.

Dichroic coupler 454 combines the residual pump radiation with the attenuated telecommunication signals to active fiber 46, which further amplifies the signals.

An optical isolator 461 is placed between the output of the first stage and the input of the second stage.

An output of said isolator terminates in one end of active fiber 47, while the other end is connected to a dichroic coupler 48. Pumping source 49 is connected to an input of said dichroic coupler 48 in such a way as to feed active fiber 48. An output of dichroic coupler 48 is connected, by means of an optical isolator 462, to an output 420 of the preamplifier.

Although the pumping scheme described (copropagating for the first stage and counterpropagating for the second stage) is preferable, other pumping schemes are equally possible.

The characteristics and type of components of the preamplifier may generally be selected according to the previous indications regarding the power amplifiers described.

In particular, in the case of the preamplifier, the lengths of active fibers 44, 46 and 47 may be advantageously around 7 m, 3 m and 6 m, respectively.

Pumping sources 42 and 49 may be, for example, quantum well lasers with an emission wavelength of $\lambda_p$=980 nm.

The optical emission power is envisaged at 65 mW for source 42 and 75 mW for source 49.

A preamplifier like the one described gives, for example, output power of 16 dBm, with a noise figure of 5 dB.

The preamplifier may also be embodied as a single stage amplifier, depending on the gain required and the characteristics of the telecommunication system in which it is to be used.

Multiplexers 4A and 4B of the system in FIG. 1 are passive optical devices, by which the optical signals superposed in a single fiber are separated on respective optical fibers, depending on their wavelength.

An example of demultiplexer well-suited for use in the present invention is indicated in FIG. 5A. The figure represents a demultiplexer well-suited for use in a system with 16 channels, i.e. 16 independent wavelengths, for each path direction. A similar scheme may be employed in cases where the system calls for a different number of channels. The signals input to a port 500 are separated by means of a 3 dB splitter, 540, to two groups of cascaded wavelength selective splitters 550 and 560 (briefly indicated as selective splitters). Each selective splitter is capable of routing to a first output the signals applied to one of its inputs with wavelengths centered around one of the transmission channels employed in the system and of reflecting to a second output the signals with wavelengths external to that band. Said second output of each selective splitter is connected to the input of a successive selective splitter, so as to form a cascaded connection. In the device illustrated in the figure, corresponding to demultiplexer 4B of FIG. 1, group 550 includes selective splitters 501, 503, . . . , 515, selective around wavelengths $\lambda_1, \lambda_3, \ldots, \lambda_{15}$ respectively, while group 560 comprises selective splitters 517, 519, . . . , 531 selective around wavelengths $\lambda_{17}, \lambda_{19}, \ldots, \lambda_{31}$, respectively. The device described is well-suited for use as demultiplexer 4B in the telecommunication system of FIG. 1. A similar device, using selective splitters at wavelengths $\lambda_2, \lambda_4, \ldots, \lambda_{32}$ may be employed to embody demultiplexer 4A of the telecommunication system in FIG. 1.

The selective splitters may preferably be of the type diagramed in detail in FIG. 5B, having four access optical fibers (input and output ports) designated 591, 592, 593 and 594, respectively, and containing in the center a selective reflecting component 595 which acts as a transmission bandpass filter and a reflective band-suppression filter, i.e. designed to transmit with low attenuation (e.g. with attenuation lower than 1.5 dB) signals with wavelengths within a predetermined band and reflecting (with attenuation of the same order of magnitude) signals with wavelengths outside that band. A signal input to fiber 591 of the selective splitter with wavelength $\lambda_p$ inside the passing band of component 595, for example, is transmitted to fiber 593 and, similarly, signals at $\lambda_p$ are transmitted from fiber 594 to fiber 592 or, symmetrically, from fiber 593 to fiber 591 and from fiber 592 to fiber 594. A signal input to fiber 591 with wavelength $\lambda_r$ outside that band, on the other hand, is reflected to fiber 594 and similarly signals at $\lambda_r$ proceed from fiber 592 to fiber 593 and symmetrically from fiber 594 to fiber 591 and from fiber 593 to fiber 592.

The band of wavelengths, close to a wavelength of minimal transmission attenuation, which corresponds, in transmission through selective reflecting component 595, to an attenuation of no more than 0.5 dB in addition to the minimal attenuation, will be indicated hereinafter as "0.5 dB passband" of selective reflecting component 595 or, by extension, as 0.5 dB passband of the selective splitter.

Likewise, the band of wavelengths, close to a wavelength of minimal reflection attenuation, which corresponds, in reflection through selective reflecting component 595, to an attenuation of no more than 0.5 dB in addition to the minimal attenuation, will be indicated hereinafter as "0.5 dB reflected band" of selective reflecting component 595 or, by extension, as 0.5 dB reflected band of the selective splitter.

The selective splitters are selected in a way that, for each of them, the wavelength of one of the communication channels is included in the respective 0.5 dB passband, while the wavelengths of the remaining communication channels are included in the respective 0.5 dB reflected band.

By analogy, the band of wavelengths corresponding in transmission through the selective splitter to an attenuation of no more than 20 dB in addition to the minimal attenuation is indicated as a −20 dB passband of the selective splitter.

Although described with four access fibers, the selective splitters suitable for the aforesaid use may have only three access fibers, the fourth (e.g. the one indicated as 594) remaining unused.

Selective splitters of the type indicated and well-suited for use in the present invention are marketed, for example, by Optical Corporation of America, 170 Locke Drive, Marlborough, Mass. (USA).

Selective splitters of the type indicated are now available, e.g., with a 0.5 dB passband of about 0.7 nm and a 20 dB bandwidth of about 2.4 nm.

Selective splitters based on Mach-Zehnder interferometers employing Bragg fiber-optic gratings, such as the "Mach-Zehnder based FBG" model produced by INNOVATIVE FIBER, are also suitable for use in the present invention.

Of possible use in the present invention are also, for example, demultiplexers made, according to the general scheme of FIG. 5A, with groups of cascaded selective splitters integrated on a single substrate, such as those produced by the aforesaid Optical Corporation of America.

Demultiplexers of the type described may be easily adapted to operate with a number of channels different from that determined in the system installation phase. It is possible, for example, to add one or more selective splitters cascaded with the selective splitters already present, so as to permit the demultiplexing of additional wavelengths.

The number of independent channels transmitted in the system may, through the present invention, be greater than the number of channels that can be separated by the available demultiplexers. Thus, for example, with reference to the example described, a total of 32 channels are transmitted through the system (16 in each direction) using demultiplexers adapted to separate 16 channels.

Multiplexers 3A and 3B of the system in FIG. 1 are passive optical devices through which the optical signals at different wavelengths, transmitted on respective optical fibers, are overlapped in a single fiber. Devices of this type can be made, for example, in the same way as the demultiplexers just described by interchanging their inputs and outputs.

A bidirectional multichannel optical amplifier 9 according to the present invention, well-suited for use in the telecommunication system of FIG. 1, will now be described in greater detail with reference to FIG. 6.

Multichannel optical amplifiers 93 and 94 connected between optical circulators 91 and 92 in such a way as to amplify the signals propagating from transmission station 1A to receiving station 2B and, respectively, from transmission station 1B to receiving station 2A, are embodied as wavelength selective optical amplifiers and namely selective at the wavelengths $\lambda_1$, $\lambda_3$, $\lambda_5$, . . . , $\lambda_{29}$, $\lambda_{29}$, $\lambda_{31}$ and, respectively, $\lambda_2$, $\lambda_4$, $\lambda_6$, . . . , $\lambda_{30}$, $\lambda_{32}$.

In a first stage of amplifier 93, a dichroic coupler 62 feeds the communication signals coming from an input port 641, connected to an output port of optical circulator 91, and the pumping radiation, coming from a first optical pumping source 61 connected to dichroic coupler 62, to a first active optical fiber 63, whose output terminates in an input of a dichroic coupler 671. A first output of dichroic coupler 671 is connected in input to an optical isolator 672, while a second output of dichroic coupler 671 is connected to an input of a dichroic coupler 675 by means of an optical fiber section, so as to constitute a low-attenuation path for the residual pump radiation downstream of active fiber 63.

A comb filter is connected between the output of optical isolator 672 and a second input of dichroic coupler 675 by means of low-reflectivity connectors 673 and 674.

The comb filter has a passband that includes wavelengths $\lambda_1$, $\lambda_3$, $\lambda_5$, . . . , $\lambda_{29}$, $\lambda_{31}$ of the signals propagating from transmission station 1A to receiving station 2B. Wavelengths $\lambda_2$, $\lambda_4$, $\lambda_6$, . . . , $\lambda_{30}$, $\lambda_{32}$ of the signals propagating in the system in the opposite direction, on the other hand, are external to the passband of said comb filter.

Said comb filter may include, as illustrated in the figure, an optical circulator 64 with a selective reflection circuit 65 connected to one of its intermediate ports. Said circuit 65 comprises serially connected filters 601, 603, 605, . . . , 629 and 631, with selective reflection at wavelengths $\lambda_1$, $\lambda_3$, $\lambda_5$, . . . , $\lambda_{29}$, $\lambda_{31}$ respectively, and is terminated by a low-reflectivity termination 650.

An output of dichroic coupler 675 terminates in a second active optical fiber 66, which in turn terminates at in input of an optical isolator 676.

Said second active fiber 66 is pumped through the residual pump radiation from first active fiber 63.

The output of optical isolator 676 is connected to a third active optical fiber 67. Active fiber 67 is fed with counter-propagating pumping radiation through a optical pumping source 69 and a dichroic coupler 68.

An output of dichroic coupler 68 is connected to an output port 642, connected to an input port of optical circulator 92.

In amplifier 93, signals at wavelengths $\lambda_1$, $\lambda_3$, $\lambda_5$, . . . , $\lambda_{29}$, $\lambda_{31}$ input to port 641 are amplified in the first stage of amplification, transmitted by the comb filter through the reflection of each signal by one of the selective reflection filters of circuit 65 and further amplified in the second stage of amplification.

Any other signals, or noise, at wavelengths external to the bands of selective reflection filters 601, 603, . . . , 631, after passage through the first amplification stage, are transmitted through circuit 65 without being reflected and are eliminated from the circuit through low-reflectivity termination 650.

Multichannel amplifier 94 is similar to multichannel amplifier 93. For a description of the corresponding parts and the general functioning of amplifier 94, refer therefore to the previous description of amplifier 93.

In amplifier 94, the comb filter has a passband that includes wavelengths, $\lambda_2$, $\lambda_4$, $\lambda_6$, . . . , $\lambda_{30}$, $\lambda_{32}$ of the signals propagating from transmission station 1B to reception station 2A. Wavelengths $\lambda_1$, $\lambda_3$, $\lambda_5$, . . . , $\lambda_{29}$, $\lambda_{31}$ of signals propagating in the system in the opposite direction are external to the passband of said comb filter.

This comb filter may comprise, as illustrated in the figure, an optical circulator 654 with a selective reflection circuit 655 connected to one of its intermediate ports. This circuit 655 includes serially connected filters 602, 604, 606, . . . , 630, 632, with selective reflection at wavelengths $\lambda_2$, $\lambda_4$, $\lambda_6$, . . . , $\lambda_{30}$, $\lambda_{32}$ respectively. Reflection circuit 655 is terminated by a low-reflectivity termination 650.

Optical amplifiers 93 and 94 described are of the two-stage type. A first stage of amplification comprises active fiber sections 63, 653 and 66, 656. Active fibers 63 and 653 are pumped directly by sources 61 and 651 through dichroic couplers 62 and 652. Active fibers 66 and 656, connected downstream from the comb filter, are pumped with residual pumping radiation present at the output of active fibers 63 and 653 by means of the low-attenuation path created by connecting together dichroic couplers 671, 675 and 681, 685, respectively.

The signal attenuation by optical isolator 672, optical circulator 64 and selective reflection circuit 65, connected along the optical signal path in the section between dichroic couplers 671,675 and 681, 685, respectively, and the reduced attenuation of the residual pump radiation compress the signal dynamics in the first amplifier stage, according to the mechanism previously illustrated with reference to differential attenuator 45 of the device in FIG. 4.

A second stage of amplification comprises active fiber sections 67 and 657, which are pumped by pumping sources 68 and 658 through dichroic couplers 69 and 659.

The second stage, operating in saturation, further compresses the signal dynamics.

The length of active fiber 67, 657 of the second stage is to advantage around ⅔ the total length of the active fiber of the first stage (fiber 63, 66).

The length of active fiber 66,656, connected downstream from the comb filter, is to advantage around half the length of active fiber 63, 653, connected upstream from the comb filter.

If the active fibers used are of the type previously indicated with reference to the power amplifier in FIG. 3, for example, the lengths of active fibers 63 and 653, 66 and 656, 67 and 657 may be around 7 m, 3 m and 6 m, respectively.

Active fiber 66, 656 may be used to good advantage, according to the description, to compensate at least in part for the signal attenuation by the comb filter.

Said active fiber 66, 656 may be omitted, however, particularly if the attenuation of the comb filter is sufficiently low. If fiber 66, 656 is not present in the amplifier, it is also possible to omit the low-attenuation path for the pumping radiation, comprising dichroic coupler 671, 675 and 681, 685, respectively, and the respective connecting optical fibers. In this case, active fiber 63, 653 is connected directly to the input of optical isolator 672, 682 and connector 674, 684 directly connects the input port of optical circulator 64, 654 and the input of optical isolator 676, 686.

Optical amplifiers 93, 94, depending on the required gain and the characteristics of the telecommunication system in which it is to be used, may also be embodied as single-stage amplifiers. It is possible, for example, with reference to device 93 of FIG. 6, to omit the second stage comprising active fiber 67, dichroic coupler 68 and pump source 69. This simpler configuration may be sufficient to cover shorter sections of optical line.

Although the embodiment described with reference to FIG. 6 is preferable, particularly in terms of noise figure and output power, another alternative would be to connect the comb filter downstream or upstream from the power amplifier, respectively.

A bidirectional multichannel optical amplifier 9 may be realized by using, where no otherwise specified, components similar to those previously described with reference to the devices in FIGS. 3 and 4.

Pump sources 61, 69, 651, 659, for example, may be quantum well lasers with an emission wavelength $\lambda_p$=980 nm. The optical emission power envisaged is around 90 mW for each source.

Optical connectors 676, 674, 683, 684, for example, are connectors with reflectivity of less than −40 dB. Connectors of this type are produced, for example, by the aforesaid firm SEIKOH GIKEN.

Selective reflection filters well-suited for use in the present invention, for example, are distributed Bragg reflection optical waveguide filters. They reflect the radiation within a narrow wavelength band and transmit the radiation outside said band. They consist of a portion of optical waveguide, e.g. optical fiber, along which an optical parameter, e.g. the refractive index, has a periodic variation. If the reflected portions of the signal at each change of index are mutually in phase, constructive interference occurs and the incident signal is reflected. The condition of constructive interference, corresponding to maximum reflection, is expressed by the relationship $2 \cdot I = \lambda_s/n$, where I indicates the pitch of the grating formed by the variations in the index of refraction, $\lambda_s$ the wavelength of the incident radiation and n the refractive index of the waveguide core. The phenomenon described is indicated in the literature as distributed Bragg reflection.

A periodic variation of the refractive index may be obtained by known techniques, e.g. by exposing a portion of optical fiber, deprived of its protective coating, to the interference fringes formed by an intense UV beam (like that generated by an excimer laser, a frequency-doubled argon laser or a frequency-quadrupled Nd:YAG laser) made to self-interfere by a suitable interferometric system, e.g. by means of a silica phase mask, as described in U.S. Pat. No. 5,351,321. The fiber, and particularly the core, are thus exposed to UV radiation of an intensity varying periodically along the optical axis. In the areas of the core reached by the UV radiation the Ge—O bonds are partially broken causing a permanent change in the refraction index.

The central wavelength of the reflected band can be determined at will by selecting a grating pitch that results in the constructive interference relationship.

With this technique it is possible to obtain filters with a −3 dB reflected wavelength band of only 0.20–0.3 nm, reflectivity at the center of the band almost up to 100%, a central wavelength of the reflected band that can be determined in the construction phase within +/−0.1 nm and a temperature variation of the central wavelength of the band not greater than 0.02 nm/° C.

Optical distributed Bragg reflection filters with a broader reflection band can be realized by gradually chirping the grating pitch along its extension between two values, corresponding to the wavelengths that delimit the desired reflection band.

Optical fiber distributed Bragg reflection filters with chirped grating are known, for example, from the article by P. C. Hill et al. published in Electronic Letters, vol. 30 no. 14, Jul. 7, 1994, pages 1172–74.

The gradual variation of the grating pitch, in a distributed Bragg reflection filter, may also be employed to realize filters capable of compensating for the delay (or advance) of some chromatic components of an optical signal with respect to others. For this reason, components of a signal with different wavelengths must be reflected by different portions of the same grating, displaced on an optical path so as to compensate for said delay or said advance.

Chromatic dispersion, i.e. the delay (or advance) per wavelength unit of a grating having a pitch that may vary between two extreme values, depends not only on the width of the reflected band but also on the length of the grating or, in greater detail, on a quantity equal to twice the length of the grating multiplied by the effective index of refraction of the means in which it is embodied. This quantity corresponds to the difference between the optical paths of the signal chromatic components which are reflected close to the two extremes of the grating.

The use of distributed Bragg reflection filters for compensating chromatic dispersion is known, for example, from the aforementioned article by F. Ouellette published in Optics Letters or from U.S. Pat. No. 4,953,939.

To compensate for the chromatic dispersion at the communication signal wavelengths, it is possible to use as selective reflection filters 601, 603, . . . , 631 and 602, 604, . . . , 632 optical fiber distributed Bragg reflection filters with chirped grating.

In this case, each of the filters will be realized with a central wavelength and passband width suitable to reflect radiation corresponding to one of the communication channels, and with dispersion characteristics that compensate for the chromatic dispersion of the corresponding communication channel.

Depending on the conditions under which the device is used, the filters may be realized in such a way as to provide the reflected communication signal with a chromatic dispersion equal in absolute value, and of opposite sign, to that (estimated or measured) accumulated by the signal through the fiber sections it has traveled, or such as to overcompensate for the dispersion accumulated by the signal, so that the dispersion is nullified at a successive point on the optical signal path, including an additional section of optical fiber.

If the amplifier is used under conditions characterized by significant variations in temperature, it may be advisable to thermally stabilize fiber optic filters 601, 603, . . . , 631 and 602, 604, . . . , 632.

The optical output power of an optical amplifier 93 or 94 as described is, in an example, about 16 dBm under operating conditions, with circulators 91, 92 connected to the two extremes and with optical input power of −10 dBm. The noise figure is around 5 dB.

The Applicant has observed that optical circulators 91 and 92 permit radiation to enter and exit in only one direction for each of optical amplifiers 93, 94 and precisely only the radiation propagating from transmission station 1A to receiving station 2B for amplifier 93 and only the radiation propagating from transmission station 1B to receiving station 2A for amplifier 94.

Optical circulators 91 and 92 therefore act as unidirectional components placed at the input and output of the two stages of optical amplifiers 93 and 94 and reduce the noise, particularly that due to counterpropagating spontaneous emission, Rayleigh and Brillouin scattering and their respective reflections along the communication line.

In addition to permitting the bidirectional amplification of the signals, the bidirectional amplifier described attenuates the propagating amplified spontaneous emission (ASE) along with the signals. In amplifiers 93 and 94, the ASE components coming from inputs 641 and 643 and those generated in active fibers 63 and 653 are removed by the respective comb filters and do not propagate to active fibers 66 and 656.

The Applicant has determined that bidirectional amplifier 9 functions stably without oscillations and with negligible interferometric noise. This is thought to derive from the fact that the arrangement of the signal wavelengths, along with the spectral characteristics of the comb filters, prevents the creation of possible feedback rings, including amplifiers 93 and 94, which might be formed in the presence of back-reflections along the optical fibers of line 8, e.g. by connectors of optical circulators 91 and 92 with said optical fiber of line 8.

An optical amplifier according to the present invention is well-suited for use not only along communication lines configured to have low reflections (e.g. employing low-reflection optical connectors and welds) but also along optical communication lines already installed and in the presence of components with non-negligible residual reflectivity, particularly if they are used along fiber-optic transmission lines in which the amplifier is connected to the line fibers by means of optical connectors, which may be of the type that transmit most of the power of the signals transiting through them, and thus ensure the optical continuity of said signals, but which under some conditions reflect back a small portion of them (e.g. in case of an imperfect clamping caused by incorrect positioning of the two fiber ends inside them).

Nonetheless, to obtain a high signal/noise ratio in the transmission along the telecommunication system, such as to permit transmission at velocities greater than or equal to 2.5 Gb/s, the optical connections linking an optical amplifier 9 and optical communication line 8 have preferably a reflectivity of less than −31 dB, more preferably less than 40 dB. Furthermore, to facilitate the operations of line installation and maintenance, these optical connections should be realized with optical connectors.

The Applicant has determined that an optical amplifier of the type described minimizes the gain tilt, a phenomenon caused by the characteristics of the doped fiber and, in particular, by the relative level of amplified spontaneous emission (ASE) and the signals along the communication line and in the amplifiers cascaded along it, which consists of a variation in gain with the wavelength and results in different gains for the various channels.

Exploiting the small residual attenuation of the selective reflection filters in the band transmitted (about 0.1 dB, for example, for passage in each direction through each Bragg grating selective reflection filter), it is possible to arrange said filters, in the selective reflection circuit that is part of the comb filter, in an order such that it compensates for the differences in gain.

In greater detail, the channels subject to less gain can be attenuated to a lesser degree by connecting the selective reflection filters related to those channels in proximity to the end of the selective reflection circuit that is connected to optical circulator 64 (the signals are reflected after passing through a limited number of selective reflection filters, thus with less attenuation), and the channels subject to greater gain can be attenuated to a greater degree by connecting the respective selective reflection filters in proximity to the opposite end of the selective reflection circuit.

Should it be necessary to compensate for the gain tilt to a greater extent than permitted by the selective attenuation provided by the filters, sections of optical fiber with calibrated attenuation may be connected between the selective reflection filters.

To compensate for a predetermined difference in gain, in output to an amplifier, between signals of different wavelengths, the difference in attenuation of the two signals in the comb filter must generally be greater, in absolute value, than said predetermined difference in output gain.

In the configuration described with reference to FIG. 6, the distances between the filters connected along the selective reflection circuit increase as the wavelength increases, so that the attenuation of each channel is attenuated by 0.2 dB more ( due to the double passage) than the adjacent channel at a lower wavelength.

In one example, the Applicant evaluated the functioning of a bidirectional multichannel telecommunication system like the one described, in a configuration including five sections of optical fiber 8, each with maximum total attenuation of 26 dB (including attenuation at the optical splices), connected by four bidirectional amplifiers 9, each of the type described.

The Applicant has determined that this communication system permits the simultaneous transmission of 16 channels in each direction of propagation at a bit rate of 2.5 Gb/s, with a minimum signalunoise ratio of 13 dB (measured on an 0.5 nm band).

In a second example, the Applicant evaluated the functioning of a bidirectional multichannel communication system like the one described but configured to operate with 8 wavelengths in each direction of propagation, with the wavelengths of the signals propagating in one direction staggered with respect to those of the signals propagating in the opposite direction. The configuration considered includes five section of fiber-optic line 8, each with a maximum total attenuation of 28 dB (including the attenuation of the optical junctions), connected by four bidirectional amplifiers 9, each of the type described.

The Applicant determined that said communication system permits the simultaneous transmission of 8 channels in each direction of propagation at a bit rate of 2.5 Gb/s, with a minimum signalvnoise ratio of 13 dB (measured on a 0.5 nm band).

In another example, regarding a communication system similar to the one in the second example but where the total maximum attenuation of each fiber-optic line section is 23 dB (including the attenuation of the optical splices), and in which the four bidirectional amplifiers include chromatic dispersion compensation means of the type indicated earlier, the Applicant determined that it is possible to transmit 8 channels simultaneously in each direction of propagation at a bit rate of 10 Gb/s, with a minimum signal/noise ratio of 18 dB (measured on a 0.5 nm band).

It is known that an optical communication system may assume the structure of an optical network connecting a number of stations to each other. Optical network is generally intended here to mean a set of fiber-optic transmission lines and their respective stations of interconnection, also known as interchange nodes. In the interchange nodes the optical signals can be routed from one of the transmission lines linked to the node to one or more of the other transmission lines linked to the node. Nodes for adding and dropping optical signals to or from the network may be positioned either along the transmission lines or at the interchange nodes. Some of the transmission lines in this optical network, in particular, may have a ring structure.

A particular example of optical network with nodes for adding or dropping signals is that of a WDM communication system comprising a fiber-optic line extended between transmission and receiving stations and intermediate stations for adding/dropping signals placed along the line. The signals at various wavelengths emitted by a transmission station propagate along an optical fiber, possibly through amplifiers, e.g. of the active optical fiber type, up to an intermediate signal addition/dropping station, which may be configured in such a way that the radiation to some of the signal wavelengths is dropped from the communication line and routed to specific receivers (which, for example, convert the signals into electrical form), while at the same time radiation to one or more of the same wavelengths, generally modulated by transmission signals (e.g. in electrical form) present at the input of the intermediate station, is inserted into the communication line downstream from the dropping point. The optical radiation output from the intermediate station is transmitted along an additional section of optical fiber, and possibly through additional amplifiers and intermediate stations for adding/dropping optical signals, until it reaches a receiving station.

Each wavelength constitutes an independent communication channel. The optical telecommunication system may be configured in such a way that it transmits optical signals separately between pairs of stations included between the terminal stations and the stations placed along the line. It is also possible to transmit independent signals with the same wavelength along lines without common sections.

In this communication line it is possible to add or drop signals at various points (nodes) along the line at some of the communication wavelengths, so that they travel only a portion of the line extension.

A scheme of a multichannel optical amplifier comprising a device of the first type for adding/dropping optical signals will now be described with reference to FIG. 7.

The figure represents an optical amplifier 93' suitable for use in a telecommunication system of the type described with reference to FIG. 1, in lieu of one or more optical amplifiers 93 of said system. In the example indicated in FIG. 7, amplifier 93' is suitable for amplifying optical signals at wavelengths $\lambda_5, \lambda_7, \ldots, \lambda_{31}$, propagating from transmission station 1A to receiving station 2B, for dropping optical signals at wavelengths $\lambda_1, \lambda_3$, from the communication line and for adding new signals at wavelengths $\lambda_1, \lambda_3$, to the same line. The scheme in FIG. 7 may be modified, applying known techniques, in such a way as to adapt it to the wavelengths to be amplified/dropped/added in each case of interest. It is possible, for example, to build an amplifier, not represented in the figure, to amplify optical signals at wavelengths $\lambda_6, \lambda_8, \ldots, \lambda_{32}$, propagating from transmission station 1B to receiving; station 2A, to drop signals at wavelengths $\lambda_2, \lambda_4$, and to add new signals at wavelengths $\lambda_2, \lambda_4$, to the same line.

Optical amplifier 93' includes one or more amplification stages between an input port 741 and an output port 742. The example indicates two amplification stages 71 and 72 that may, for example, be analogous to the amplification stages previous described with reference to amplifier 93 of FIG. 6.

A comb filter is connected in series, between input 741 and output 742, to a signal adding/dropping device.

The position of said comb filter may be determined as previously indicated in relation to the amplifier of FIG. 6.

According to the example illustrated in FIG. 7, a comb filter comprises an optical circulator 64', at an intermediate port of which is connected a first end of a selective reflection circuit 65', including filters 605, 607, . . . , 631, with selective selection at wavelengths $\lambda_5, \lambda_7, \ldots, \lambda_{31}$, and for the rest equal to selection filter 65 of FIG. 6.

A second end of said selective reflection circuit 65' is connected to an intermediate port of an optical circulator 73. An output port of optical circulator 73 is connected to a selective splitter 701, with passband centered around wavelength $\lambda_1$ and wide enough to exclude the adjacent wavelengths propagating along the communication line in the same direction of signal propagation as wavelength $\lambda_1$. Said selective splitter may be, for example, of the type described with reference to FIG. 5B. Connected in series to selective splitter 701 is a second selective splitter 703, with a passband of similar width but centered around wavelength $\lambda_3$.

The device formed by cascading selective splitters 701, 703, according to what was indicated with reference to FIG. 5A, creates a demultiplexer at wavelengths $\lambda_1, \lambda_3$. The signals at said wavelengths are made available, at outputs 75, 76 respectively, to an outside user, consisting, for example, of a pair of optical receivers.

A device symmetric to the one described, comprising selective splitters 751, 753, similar respectively to selective splitters 701, 703, forms an input multiplexer, connected to an input port of optical circulator 73, which can send to said second end of selective reflection circuit 65' the respective optical signals at wavelengths $\lambda_1, \lambda_3$ present at inputs 77, 78 of selective splitters 751, 753.

In amplifier 93', signals at wavelengths $\lambda_5, \lambda_7, \ldots, \lambda_{31}$, are amplified in amplification stage 71, transmitted by the comb filter connected between the two stages through the reflection of each signal by one of the selective reflection filters of circuit 65', further amplified in amplification stage 72 and sent to output 742. Signals at wavelengths $\lambda_1, \lambda_3$, on the other hand, after being amplified through amplification stage 71, pass through selective reflection circuit 65' and are dropped to respective outputs 75, 76. Other signals at wavelengths $\lambda_1, \lambda_3$, present at inputs 77, 78 of selective splitters 751, 753, pass through selective reflection circuit 65' and are combined, through optical circulator 64', with the signals at wavelengths $\lambda_5, \lambda_7, \ldots, \lambda_{31}$, and are then amplified with them in amplification stage 72 and then sent to output 742.

The scheme of a multichannel optical amplifier comprising a device of a second type for adding/dropping optical signals will now be described with reference to FIG. 8.

The figure shows an optical amplifier 931 suitable for use in a telecommunication system of the type described with reference to FIG. 1, in lieu of one or more optical amplifiers 93 of said system. In the example shown in FIG. 8, amplifier 93" is suitable for amplifying optical signals at the 16 wavelengths $\lambda_1, \lambda_3, \ldots, \lambda_{29}, \lambda_{31}$, propagating from transmission station 1A to receiving station 2B and, among said signals, dropping/adding from/into the optical communication line one or more signals at the 8 wavelengths, $\lambda_1$, $\lambda_7, \ldots, \lambda_{27}, \lambda_{31}$, according to a scheme that may be selected according to requirements, by means of appropriate control signals.

By modifications according to known techniques of the scheme that will be described in the following, an optical amplifier can be made, symmetrical to the previous one, suitable for amplifying optical signals at the 16 wavelengths $\lambda_2, \lambda_4, \ldots, \lambda_{30}, \lambda_{32}$, propagating from transmission station 1B to receiving station 2A and, among said signals, dropping/adding from/into the optical communication line one or more signals at the 8 wavelengths $\lambda_4, \lambda_8, \ldots, \lambda_{28}$, $\lambda_{32}$, according to a scheme that may be selected according to requirements, by means of appropriate control signals.

Optical amplifier 93" comprises one or more amplification stages between an input port 841 and an output port 842. The example indicates two amplification stages 81, 82 which may be, for example, similar to the amplification stages described earlier with reference to amplifier 93 of FIG. 6.

A comb filter, cascaded to a signal add/drop device, is connected at an intermediate position between input port 841 and output port 842.

The position of this filter may be determined based on what was indicated earlier regarding the amplifier of FIG. 6.

According to the example illustrated in FIG. 8, a comb filter comprises an optical circulator 64", at an intermediate port of which a first end of a first selective reflection circuit 84 is connected, comprising 8 filters 601, 605, ..., 629, with selective reflection at wavelengths $\lambda_1, \lambda_5, \ldots, \lambda_{29}$, respectively, and for the rest similar to selective reflection circuit 65 of FIG. 6.

Signals at wavelengths $\lambda_1, \lambda_5, \ldots, \lambda_{29}$, are reflected by one of the selective reflection filters to said intermediate port of optical circulator 64" and by it to the second stage 82 of the amplifier and then to output 842.

Signals at wavelengths $\lambda_3, \lambda_7, \ldots, \lambda_{31}$, on the other hand, are not reflected by said selective reflection circuit 84 and are transmitted to a second end of said circuit 84, which is connected to a first port of an optical circulator 85, from there to a second port of optical circulator 85, following in a sequence said first port, and then to a demultiplexer 86, connected to said second port. Said demultiplexer 86 (which may be embodied, for example, by cascaded wavelength selective splitters, as described with reference to FIG. 5A) separates each signal at wavelengths $\lambda_3, \lambda_7, \ldots, \lambda_{31}$, to a different optical path. The output of said optical paths is connected to an input of optical switches 871, 872, ..., 878.

In addition to a first optical input, connected to demultiplexer 86, said optical switches also have a second optical input, which may be connected to transmitters 851, ..., 858, suitable for generating signals at wavelengths $\lambda_3, \lambda_7, \ldots$, $\lambda_{31}$, and two optical outputs. The first of said optical outputs is connected to an optical multiplexer 87, suitable for multiplexing the signals at different wavelengths into a single output, while the second of said optical outputs is connected to an optical receiver.

By means of appropriate control signals, fed to each of said switches, it is possible to modify their transmission state in one of the following two ways: bar mode, corresponding to the direct connection of said first input with said first output, and cross mode, corresponding to the connection of said first input with said second output and, respectively, of said second input with said first output.

The optical switches may be, for example, model SR2:2 of JDS FITEL Inc., 570 Heston Drive, Nepean, Ontario (Canada).

The signals switched to said second outputs are made available to external users consisting, for example, of optical receivers connected to said second outputs.

The signals coming from said first outputs, on the other hand, are sent to a multiplexer 87, multiplexed by it onto a single output and sent, possibly through an optical amplifier 88, to a third port of said optical circulator 85.

Optical amplifier 88, of a known type, is suitable for compensating the attenuation of the signals at wavelengths $\lambda_3, \lambda_7, \ldots, \lambda_{31}$, in the portion of the optical circuit between the first port of optical circulator 85 and the optical amplifier itself. At the same time, optical amplifier 88 amplifies the signals input into the system through one of optical switches 871, 872, ..., 878, bringing said signals to a power level comparable to that of the other signals at the different wavelengths.

The signals input to the third port of optical circulator 85 are then transmitted to a fourth port of the same optical circulator, to which is connected a first end of a second selective reflection circuit 89, including filters 603, 607, ..., 631, with selective reflection at wavelengths $\lambda_3, \lambda_7, \ldots$, $\lambda_{31}$, respectively. The signals at said wavelengths are reflected to the fourth port of the optical circulator, from it to the first port of same and, through selective reflection circuit 84 and optical circulator 64", are combined with the remaining signals. The signals with wavelengths external to the reflection band of filters 603, 607, ..., 631, including noise at intermediate wavelengths, are eliminated from the optical circuit through low-reflection termination 650, connected to a second end of selective reflection circuit 89.

A multichannel amplifier 93" of the described type makes it possible to amplify a certain number of wavelengths ($\lambda_1$, $\lambda_5, \ldots, \lambda_{29}$) and can be configured to drop and/or add to the system one or more signals at different wavelengths ($\lambda_3$, $\lambda_7, \ldots, \lambda_{31}$).

The Applicant observes the described amplifier 93" may include an optical demultiplexer 86 and an optical multiplexer 87 with a relatively low wavelength resolution. The demultiplexer and multiplexer, namely, need only be suitable for separating signals different in wavelength from twice the minimum wavelength distance between signals propagating in the same direction in the optical communication system.

What is claimed is:

1. Optical amplifier comprising:
    a first input for inputting first optical signals propagating in a first direction having a first series of mutually distinct wavelengths;
    a first output for outputting second optical signals propagating in a first direction having said first series of mutually distinct wavelengths;
    a first amplifier for amplifying said first optical signals; and
    a first optical circulator having
        an input port coupled to said first amplifier,
        an intermediate port coupled to a first end of a first selective reflection circuit,
        an output port coupled to said first output; and further comprising a second optical circulator having
            an intermediate port coupled to a second end of said first selective reflection circuit;
            an output port coupled to a first selective splitter, with passband centered around a first predetermined wavelength of said first series and wide enough to exclude the adjacent wavelengths of said first series; and
            an input port coupled to a second selective splitter, with passband centered around said first predetermined wavelength of said first series and wide enough to exclude the adjacent wavelengths of said first series.

2. Optical amplifier according to claim 1, further comprising a third selective splitter coupled in series to said first selective splitter, with passband centered around a second predetermined wavelength of said first series and wide enough to exclude the adjacent wavelengths of said first series.

3. Optical amplifier according to claim 1, further comprising a fourth selective splitter coupled in series to said second selective splitter, with passband centered around a second predetermined wavelength of said first series and wide enough to exclude the adjacent wavelengths of said first series.

4. Optical amplifier according to claim 1, further comprising a second amplifier coupled to said first output for amplifying said second optical signals.

5. Optical amplifier according to claim 1, further comprising:
    a second input for inputting third optical signals propagating in a second direction, opposite said first direction having a second series of mutually distinct wavelengths;
    a second output for outputting fourth optical signals propagating in a second direction, opposite said first direction having said second series of mutually distinct wavelengths;
    means for separating said first optical signals from said fourth optical signals;
    a third amplifier for amplifying said third signals; and
    means for separating said second and said third signals; wherein said first series of mutually distinct wavelengths and said second series of mutually distinct wavelengths are mutually staggered.

6. Optical amplifier according to claim 5, further comprising:
    a third optical circulator having
        an input port coupled to said third amplifier,
        an intermediate port coupled to a first end of a second selective reflection circuit, and
        an output port coupled to said second output; and
    a fourth optical circulator having
        an intermediate port coupled to a second end of said second selective reflection circuit;
        an output port coupled to a fifth selective splitter, with passband centered around a first predetermined wavelength of said second series and wide enough to exclude the adjacent wavelengths of said second series; and
        an input port coupled to a sixth selective splitter, with passband centered around said first predetermined wavelength of said second series and wide enough to exclude the adjacent wavelengths of said second series.

7. Optical amplifier according to claim 5, wherein said means for separating include respective optical circulators.

8. Optical amplifier according to claim 1 or 6, wherein said selective reflection circuit comprises Bragg grating filters.

9. Optical amplifier according to claim 1, wherein said selective reflection circuit reflects the wavelengths of first series of mutually distinct wavelengths except said first predetermined wavelength.

10. Multichannel optical telecommunication system for transmitting optical signals comprising:
    a fiber-optic line having a first and a second end;
    a transmission station inputting, at said first end of said line, first optical signals propagating in a first direction and having a first series of mutually distinct wavelengths;
    a first demultiplexer at said second end of said line; and
    an amplifier optically connected along said fiber-optic line, having a first input for inputting said first optical signals, for amplifying said first optical signals on said first path;
    characterized by the fact that said amplifier for amplifying said first optical signals is coupled to a first end of a comb filter, and a second end of said comb filter is coupled to a first selective splitter, with passband centered around a first predetermined wavelength of said first series and wide enough to exclude the adjacent wavelengths of said first series, and to a second selective splitter, with passband centered around said first predetermined wavelength of said first series and wide enough to exclude the adjacent wavelengths of said first series.

* * * * *